May 20, 1941.  H. F. FLOWERS  2,242,854
BRAKING EQUIPMENT FOR TANDEM WHEEL TRUCK STRUCTURES
Filed May 20, 1939  7 Sheets-Sheet 1

May 20, 1941.   H. F. FLOWERS   2,242,854
BRAKING EQUIPMENT FOR TANDEM WHEEL TRUCK STRUCTURES
Filed May 20, 1939   7 Sheets-Sheet 5

Patented May 20, 1941

2,242,854

UNITED STATES PATENT OFFICE 2,242,854

BRAKING EQUIPMENT FOR TANDEM WHEEL TRUCK STRUCTURES

Henry Fort Flowers, Findlay, Ohio

Application May 20, 1939, Serial No. 274,849

11 Claims. (Cl. 303—21)

The invention relates generally to tandem wheel truck structures of the type disclosed in U. S. Letters Patent 2,063,545 and 2,078,915, issued on December 8, 1936, and April 27, 1937, respectively, to Henry Fort Flowers, and primarily seeks to provide certain new and useful improvements in braking equipments of the fluid pressure actuated type which are particularly adaptable to structures of this type including means for automatically controlling the application of fluid pressure by the tendency of the brake shoes to rotate with the wheels against which they are applied.

In truck structures of the type stated, pairs of truck elements or units are independently pivoted to cross bolster structures and are tie bar connected so as to be maintained in substantially parallel relation. Each of these truck elements or units carries a pair of wheels disposed in tandem relation, and in providing braking equipments for wheels mounted in this fashion provision must be made for accommodating the independent movements of the individual truck elements without disrupting the braking equipment connections or controls. It is also highly desirable never to apply to the individual wheels sufficient braking pressure to lock the wheels and cause them to slide.

Therefore, it is an object of the invention to provide novel braking equipments adaptable to use on tandem wheel truck units and including actuating and control devices which will permit independent movements of the truck units or elements without interference with the efficiency of the braking functions and which are capable of automatically diminishing the application of braking pressure as the braking force tends to become too great and approaches to wheel locking stage, or of increasing said pressure as the braking efficiency decreases as a result of heat of friction.

In its more detailed nature the invention seeks to provide a control equipment of the nature stated wherein is included a fluid pressure control valve and a yoke structure which is shiftably mounted and carries the brake shoe equipment, said yoke structure being operatively connected with the valve so that movement imparted to the yoke structure due to the tendency of the brake shoe equipment to rotate with the wheel will be transmitted to the control valve for fluid pressure application controlling purposes.

Another object of the invention is to provide a control equipment of the nature stated in which the yoke structure is swingable about the axis of the wheel with which it is associated and has its movement resisted by a spring whereby it will be torque actuated in one direction and spring actuated in the opposite direction for valve adjusting purposes.

Another object of the invention is to provide a control equipment of the nature stated in which the valve, the yoke structure, and the spring equipment are so corelated that they cooperate in like manner regardless of the direction of rotation of the associated wheel.

Another object of the invention is to provide a control valve including a novel by-pass and check valve arrangement effective to permit the pressure fluid to pass back from the brake cylinder through the supply line for exhausting in a normal way at any time that it is desired to release the brakes.

With the above and other objects in view that will hereinafter appear, the nature of the invention will be more clearly understood by following the detailed description, the appended claims, and the several views illustrated in the accompanying drawings.

In the example of embodiment of the invention herein disclosed, each truck element includes the horizontally disposed upper plating 5 and opposed lower plating 6 spaced from the upper plating and having a lower central point 7 and converging upwardly in the fore and aft direction toward said upper plating. The sides of each truck element are closed by suitably spaced side plating 8, and the side and top and bottom plating is suitably reinforced by angle plates 9 welded to said plating.

Bearing boxes 10 are secured in spaced relation at each end of each truck element, and each pair of such boxes serves to support a stub axle 11 on which a wheel is rotatably mounted. Each wheel is accommodated in bifurcations 12 in the plating 5 and 6 and includes a tread surface 13, the usual flange 14 and laterally disposed brake ring portions 15.

The brake ring portions 15 are opposed by arcuate brake shoes 16 controlled by suitable actuator devices generally designated 17 and to which movement can be applied by application of fluid pressure through the brake cylinder equipments generally designated 18 under automatic torque control through the medium of pressure control devices generally designated 19, or manually through suitable tackle generally designated 20. The particular braking equipment, peculiarly adapted to tandem wheel trucks of the type disclosed, and the novel means herein disclosed for automatically controlling application of the brakes so as to avoid sliding of the wheels, forms the main basis of the present invention.

Each truck element also includes central cradle plating 21 and well plating 22 spaced in the fore and aft direction with respect to the geometrical vertical center of the truck element and tilted up and inwardly in a manner for forming a gimbal well 23.

The well 23 accommodates the positioning of a gimbal structure composed of an outer shell or sleeve 24 and an inner shell or sleeve 25 concentric with and spaced a considerable distance inwardly of the outer sleeve. The sleeves 24 and 25 are separated by a live rubber cushion or sleeve 26 which is interposed between and vulcanized to said sleeves. This rubber sleeve allows the inner sleeve 25 to partake of a considerable amount of vertical and lateral movement within the outer sleeve 24.

The outer sleeve structure 24 also includes a bottom plate 27 which rests upon a rubber mat 28 interposed between the plate 28 and the cradle plating 21. A king post sleeve 29 is telescopically mounted in the inner sleeve 25 and extends upwardly through the well 23 and includes an abutment partition 30. An equipment of nested compression springs 31 may be interposed between the partition and the bottom member 32 of the inner gimbal sleeve 25.

An annular grooved mounting ring 33 is carried by each truck element top plating 5 in position for surrounding the respective king post well 23, and this ring is encircled by a flexible dust guard 34 which grips the king post sleeve 29 as at 35. The king post sleeves 29 of each complementary pair of truck elements or units are secured as at 36 to a cross bolster 37 which may comprise a cylindrical body formed of flange-secured half portions. The cross bolsters serve to secure complementary pairs of truck elements in generally parallel spaced relation and the bolsters of each car are secured in longitudinally spaced relation by a suitable center beam structure 38 which is mounted upon and secured in any approved manner to the bolsters in the manner illustrated in Figures 1 and 2 of the drawings.

If desired, each truck element may be reinforced at each side of its king post equipment by suitable vertically disposed gusset elements 39.

A tie bar is connected across the truck elements toward the end of each complementary pair thereof. Each tie bar preferably comprises an inverted channel member 40 which is pivotally connected as at 41 to each truck element of a complementary pair of truck elements at a point outside the track gage line in the manner illustrated in Figures 1 and 2 of the drawings. The tie bar members thus connected across between the truck elements cause said elements to move in unison. The tandem mounted wheels of the complementary truck elements are held to gage by the tie bars 40, and any time a vertical plane passing through the centers of the king posts is not normal to the track at that point (normal meaning perpendicular to the tangent) the effective gage of the wheels is reduced, causing the wheel gage to be narrower than the track gage, and thus producing a fore-shortening effect. The tie bars being anchored to the truck frames at points outside of the track gage lines will force the truck elements apart or outwardly when rounding curves and tend to compensate for this fore-shortening, or in other words, tend to cause the wheel gage lines to coincide with the track gage lines in the rounding of the curves. The resilient mounting of the gimbal elements will permit the necessary spreading of the truck elements.

The tread surfaces of the flanges 14 of each wheel hereinbefore mentioned only generally are formed on a steel alloy tread ring 42 which encompasses the main body portion 43 preferably formed of gray iron or other suitable braking surface material and which includes the hub structure and the brake ring portions 15 previously referred to. The laterally presented braking surfaces of the rings 15 preferably are polished over the whole area to be engaged by the brake shoes.

Each wheel is cored out to provide a central chambering 44 and the lateral walls of the wheel body 43 are provided with annular rows of large inlet apertures 45 disposed just inside the brake rings 15, and with similar rows of smaller outlet apertures 46 just outside said rings. It will be noted also that radial blades or fins 47 are provided in the chambered wheel portions between the inner and outer rows of apertures 45 and 46.

As each wheel rotates, the air will be drawn into the inlet apertures 45 adjacent the hub and will be expelled through the discharge apertures 46. The transverse radial fins 47 connecting and reinforcing the two side walls at the positions of the brake rings 15 serve as fan blades for increasing the velocity of the air as the speed of the wheel is increased. By reason of the provision of this ventilating equipment the wheel structures are efficiently cooled during travel of the vehicle and the cooling effect increases as the speed increases so as to avoid excessive heating at high speeds.

In the improved wheel structure herein disclosed the heat of friction resulting from the application of the brake shoes to the lateral braking ring faces is dissipated by the wheel ventilating equipments, and by reason of the fact that the braking force is applied to the gray iron wheel portion 43 the heat generated tends to expand the inner wheel body into and tighten the tire rather than loosen it, as would be the case should the braking force be applied to the tire.

Figures 4, 16:
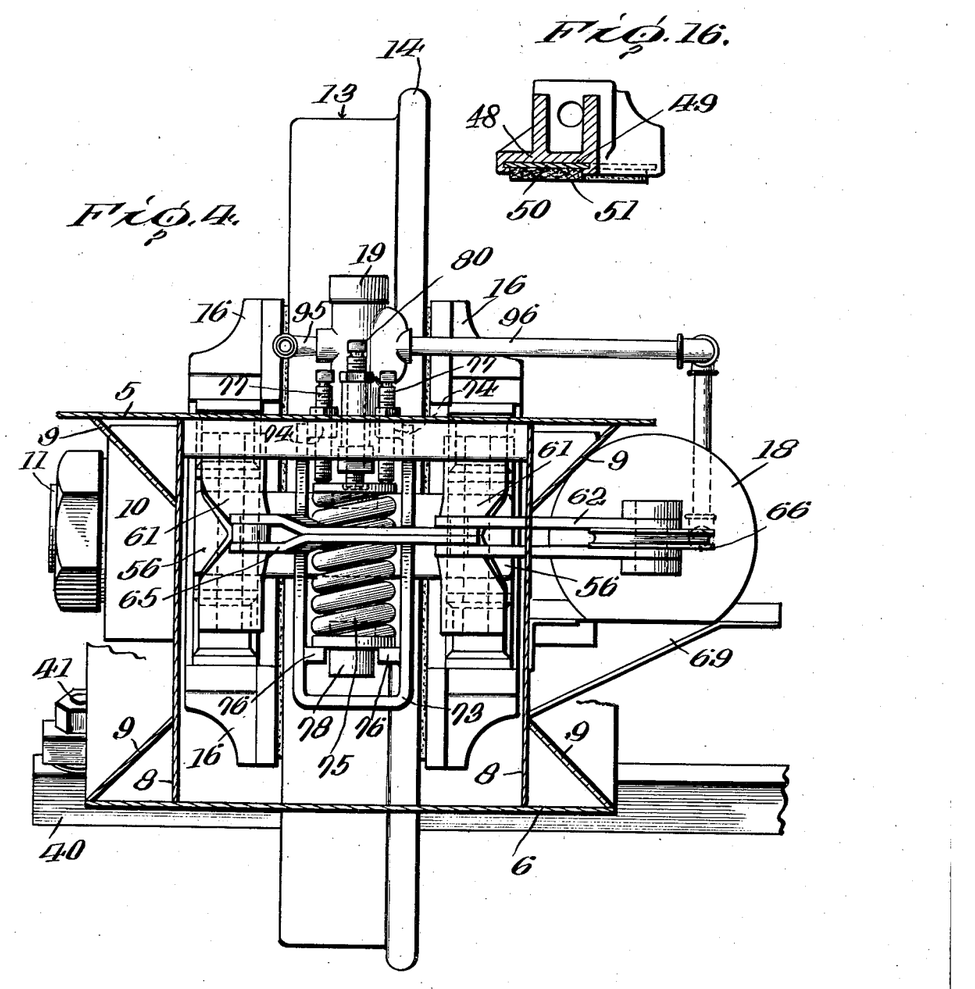
Figures 4 and 5 are vertical cross sections respectively taken on the lines 4—4 and 5—5 on Figure 3.
Figure 16 is a detail view of one of the arcuate brake shoes.

Each brake shoe 16 includes an arcuate body 48 having an undercut face groove 49 for removably receiving a mounting plate 50 having a fabric or composition braking material pad 51 affixed thereto. Each removably mounted brake surface equipment 50, 51 is held in place in its mounting groove by groove closure plates 52 one of which is mounted at each end of the respective brake shoe. Each brake shoe also includes a pair of vertically spaced and aligned actuator arm end mounting eyes 53.

Pivotally mounted about each stub axle 11 as at 54, and straddling the respective wheel, is a U-shaped yoke member including side arms 55 and a base or cross arm 56. Each side arm 55 is equipped with a vertically disposed bearing portion 57 carrying a bearing pin 58. Each pin projects upwardly and downwardly beyond the bearing portion in which it is mounted and provides pivotal support for a U-shaped actuator member formed to present short brake shoe carrying arms 59 which are pivotally secured as at 60 to the mounting eyes 53 of the brake shoes, and a relatively long actuator arm portion 61 shaped to straddle the yoke portions 55 and 56.

Figure 1:
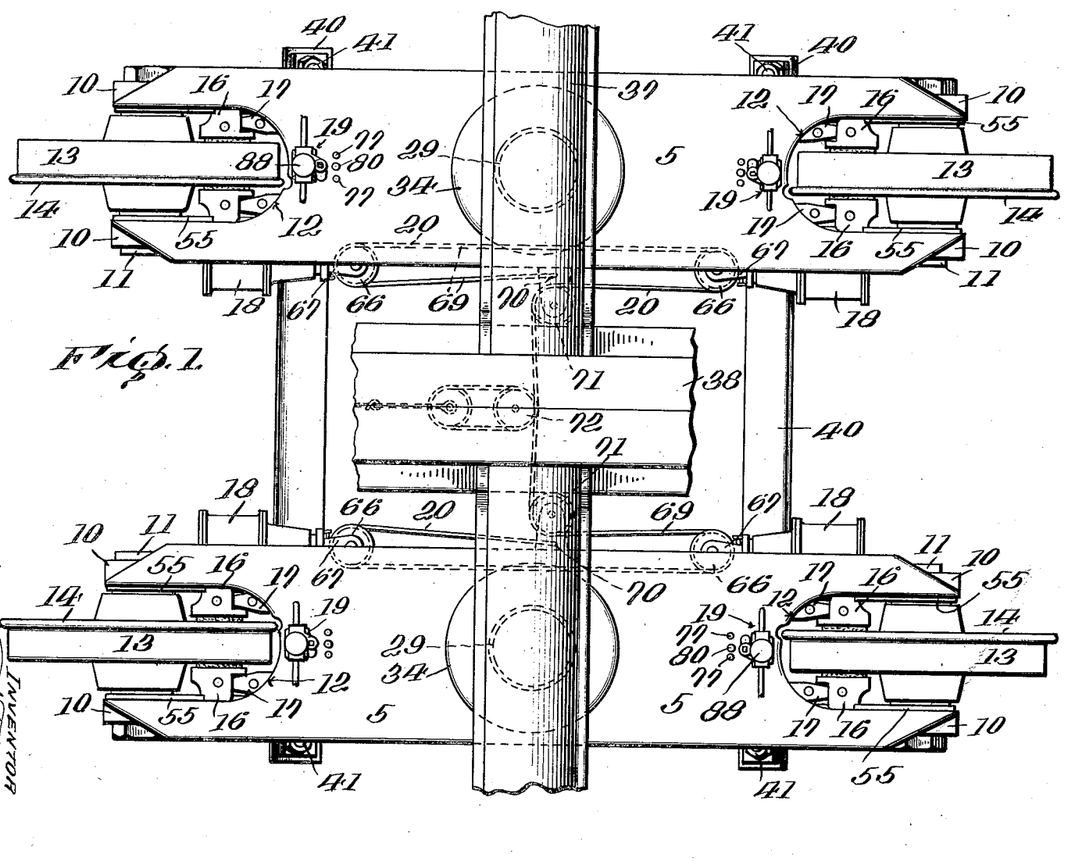
Figure 1 is a plan view of a truck structure embodying the invention.
Figure 2:
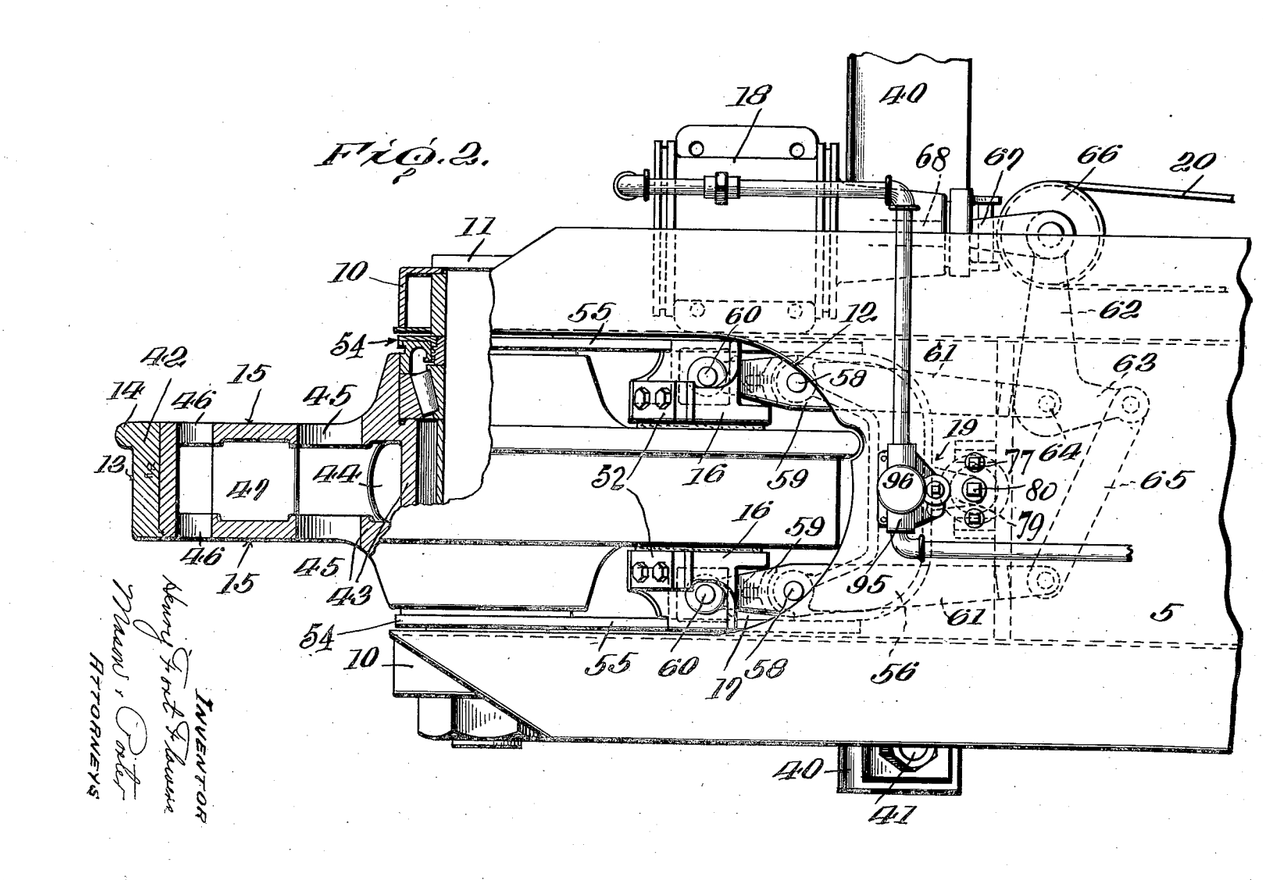
Figure 2 is an enlarged plan view illustrating a fragment of a truck unit embodying the invention.

By reference to Figures 1 and 2 of the drawings it will be obvious that as the free ends of each cooperating pair of the actuator arms 61 are moved toward each other they will force the associated brake shoes away from the wheel disposed between them, whereas when said arm ends are moved in the opposite direction or separated, the brake shoes will be applied to said wheel.

In order to impart the necessary movements to the actuator arms 61 for applying and releasing the brakes, the inner arm of each associated pair has mounted thereon a bell crank lever having a long arm 62 and a short arm 63, said lever being pivoted to the free end of the actuator arm as at 64. The short arm 62 is link-connected as at 65 to the free end of the other actuator arm 61, and the free end of the long arm 62 carries a pulley 66 and is connected as at 67 with the piston rod 68 of a brake cylinder 18 supported as at 69 on the truck unit frame and to which fluid pressure is applied in a manner soon to be described. See Figures 2 and 4.

As has been previously stated, the brakes may also be applied manually, and the tackle 20 hereinbefore referred to may include a cable 69 anchored as at 70 at each truck element side and passing over the bell crank carried pulleys 66 and idler pulleys 71 to a centrally disposed idler pulley equipment 72 associated with a common draft connection 20.

By reason of the fact that the brake shoe supporting and actuating arm structures 59, 61 are pivotally supported as at 60 on the yoke structure 55, 56, as the brake shoes 16 are applied to the wheel sides they will tend to move around with the wheel, in either direction of travel thereof, and this movement will be transmitted to the particular yoke structure 55, 56, causing it to swing about the axis of the wheel. This torque effect is utilized to control the application of fluid pressure in the fluid pressure actuation of the braking devices so as to avoid locking of the brakes and sliding of the wheels.

An open frame or bracket 73 is secured at 74 to each truck unit frame structure adjacent each particular yoke base 56, and a compression spring 75 is positioned in each bracket 73 with its lower end abutting fixed stops 76 and its upper end opposed by an adjustable stop equipment in the form of a pair of laterally spaced screws 77. It will be obvious that by adjustment of the screws 77 the resistance to compression of the respective springs 75 can be altered. Each spring 75 is opposed at its lower end by a lug 78 projecting from the bottom of the respective yoke base and at the top by a screw 80 threaded through a similar lug 79 projecting from the upper portion of the particular yoke base. The screw 80 may be adjusted to compensate for the adjustments of the stop screws 77 and always engages the upper terminus of said spring. Each spring 75 thus resists upward or downward swinging motion of the particular yoke 55, 56 under the torque or urge imparted by the applied brake shoes 16.

Figure 6:
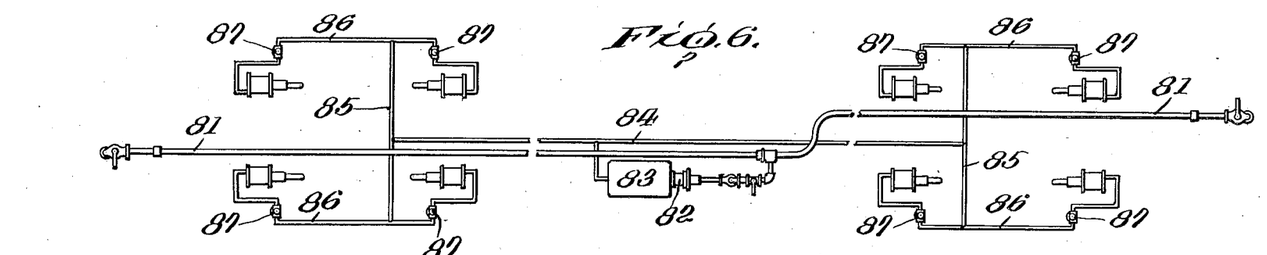
Figure 6 is a diagrammatic plan view illustrating the fluid pressure supplying equipment for one car or vehicle, two brake cylinders being provided for each truck unit or element, one for each tandem wheel thereof, and four such cylinders serving each complete truck.
Figure 7:
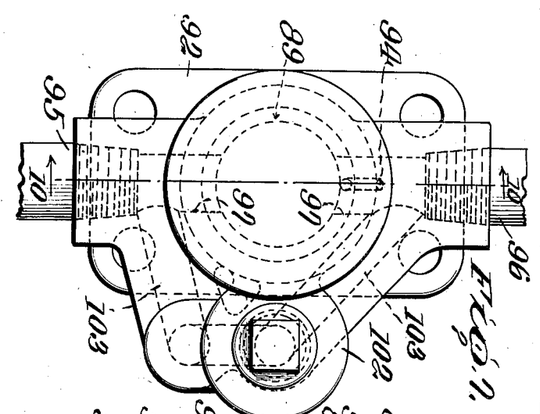
Figure 7 is an enlarged plan view of one of the fluid pressure control valves.
Figures 8, 9, 10, 12:
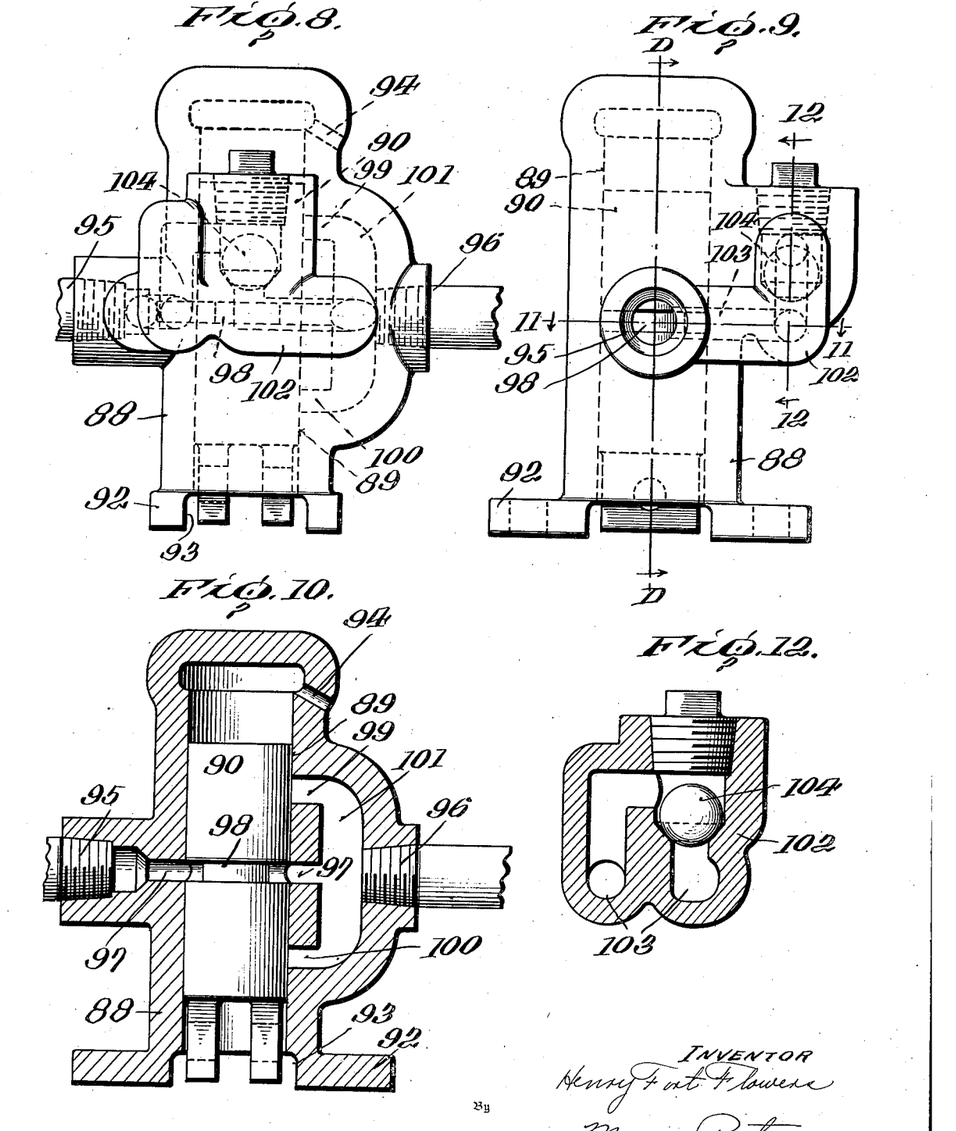
Figures 8 and 9 respectively illustrate said valve in front and left-end elevation.
Figure 10 is a vertical longitudinal section of said valve taken on the line 10—10 on Figure 7.
Figure 12 is a detail vertical longitudinal section taken on the line 12—12 on Figure 9.
Figure 11:
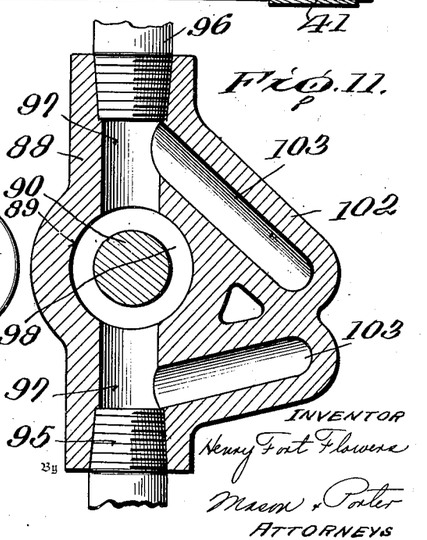
Figure 11 is a horizontal section of said valve taken on the line 11—11 on Figure 9.

In Figure 6 of the drawings there is illustrated diagrammatically the fluid pressure applying equipment to be carried by a single car or vehicle embodying the present invention. This equipment includes the usual train line 81 connected through a triple valve 82 with an auxiliary reservoir 83 which is in turn connected with the four brake cylinders 18 associated with each complete truck structure at the respective ends of the car or vehicle through the pipe line 84, a common cross line 85 and individual truck unit lines 86. Each individual truck line 86 is connected at its ends with the pair of brake cylinders mounted at the respective ends of the particular truck unit or side frame through control valves generally designated 87.

The control valves generally designated 87 are illustrated in detail in Figures 7 to 15 of the drawings and each includes a casing 88 having a vertically disposed valve slide chamber or bore 89 in which a valve member 90 is reciprocably mounted. Reciprocation is imparted to each valve member 90, for controlling the fluid pressure applied to the associated truck unit wheel, by movement of the associated yoke structure 55, 56 swingable about the axis of that wheel, said yoke structure being link-connected as at 91 to the particular valve member.

Figure 3:
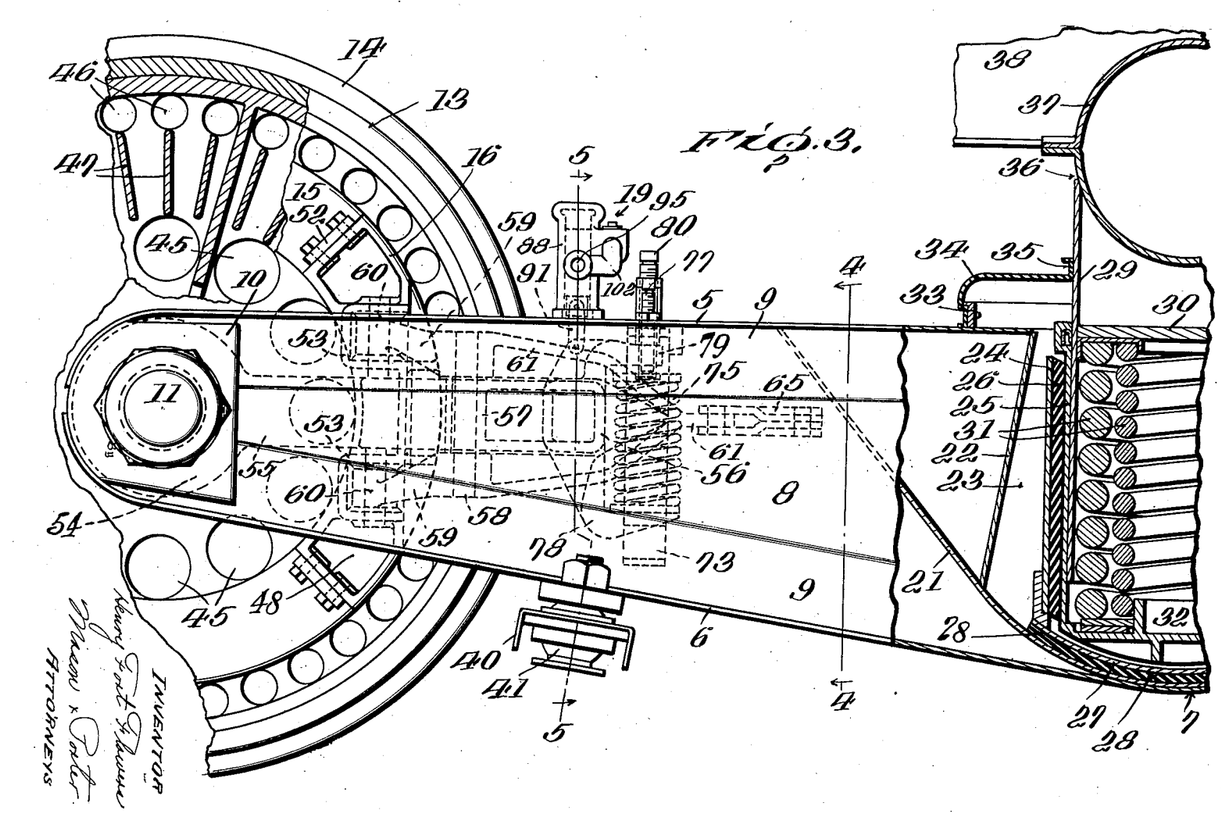
Figure 3 is an enlarged side elevation illustrating a half portion of a truck unit embodying the invention.
Figure 5:
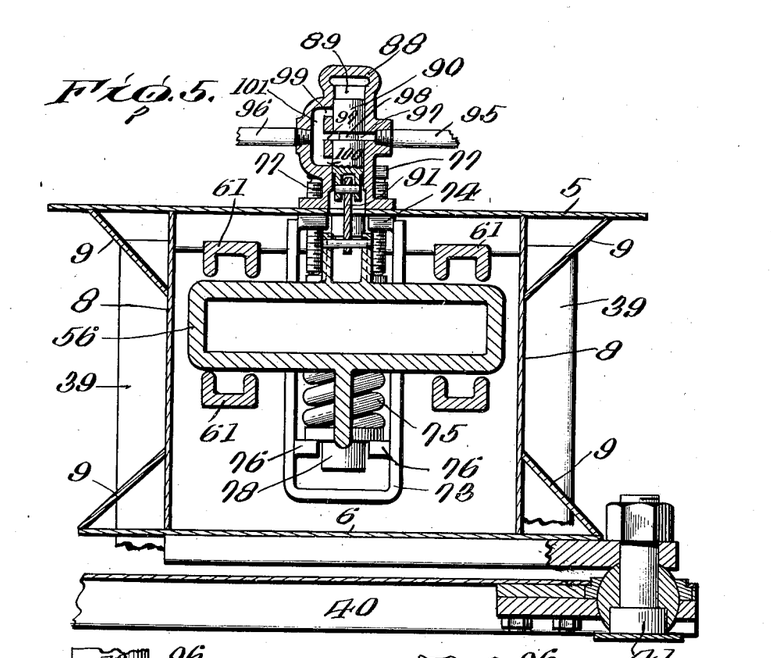

Each valve casing includes a base 92 which is fixed upon the truck unit frame structure directly over the center of the respective yoke base in the manner illustrated in Figures 3, 4 and 5 of the drawings, each said base 92 including a recessed portion 93 which communicates with the valve bore 89 and through which braking fluid pressure may be exhausted from the lower end of the valve in a manner later to be described. For similar brake fluid exhausting purposes, the upper end of each valve chamber 89 is equipped with an exhaust port 94.

Each valve casing also includes a tap 95 for connection with the pipe line portion leading to the respective valve from the auxiliary reservoir, and a tap 96 for connection with the portion of the pipe line leading from the respective valve to the associated brake cylinder. A direct passage 97 is provided through the center of each valve casing and in communication with the taps or connections 95, 96 thereof, and each valve member 90 includes an annular port 98 which normally affords through communication between the associated connections 95, 96 so that normally the braking action is under complete control of the engineer or vehicle operator through the train line in the usual manner.

Each valve casing also includes an upper exhaust port 99 and a lower exhaust port 100, said port being in constant communication with each other and with the pipe line connection 96 leading to the associated brake cylinder through a connecting leg 101. Each casing also includes a lateral enlargement 102 in which is formed a by-pass duct 103 passing around the valve chamber 89 and including a suitably seated check valve 104 so arranged that free communication is afforded through the by-pass from the brake cylinder connection 96 to the auxiliary reservoir connection 95. The check valve prevents direct communication between the auxiliary reservoir and the brake cylinder except through the normally open valve ports 97, 98.

In operation, when a vehicle is traveling over the trackway and it is desired to apply the brakes, the engineer or operator reduces the pressure in the train line in the usual manner, and since all of the control valve portings 97, 98 are normally open the control valves will have no effect on normal operations of the braking equipments. The fluid pressure applied in the respective brake cylinders 18 will act through the bell crank lever and link connections 62, 63, 65 to move the free ends of the actuator arms 61 apart and effect an application of the brake shoes 16.

So long as the braking effort is less than a predetermined maximum such as would cause the wheels to lock and slide on the rails, which maximum is determined by the resistance of the spring equipments 75, the control valves 87 will have no effect on the braking operations.

Figures 13, 14, 15:
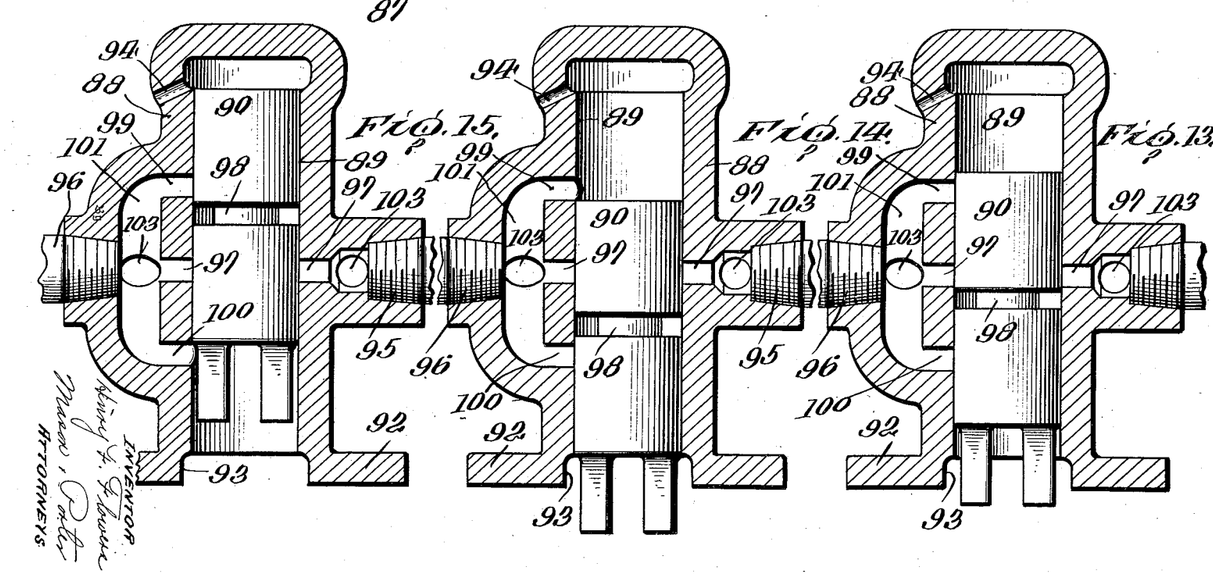
Figures 13, 14 and 15 are vertical longitudinal sections of said valve taken on the line D—D on Figure 9 and they respectively illustrate one lapped and two opposite exhausting positions of the valve.

Should an objectionable braking effort be applied to the wheels, or any particular wheel, such as would cause sliding of said wheel or wheels, the brake shoes 16 tending to turn with the wheel or wheels would swing the yoke equipments 55, 56, and overcome the resistance of the spring equipments 75 so as to lift or lower the valve elements 90, according to the direction of rotation of said wheel or wheels. A moderately excessive application of braking effort would move the valve element in one direction or the other to a lap position such as is illustrated in Figure 13 of the drawings, thus completely cutting off the fluid pressure application. A more excessive braking effort against wheels turning in one direction or the other would move the valve elements to one or the other of the positions illustrated in Figures 14 and 15, thereby not only cutting off the application of fluid pressure but also permitting the pressure fluid from the brake cylinders to exhaust through the exhaust porting 101, 99 and 94 or 101, 100, 93, and about the respective ends of the valve element 90. In the lapped positions of the valve, one of which is illustrated in Figure 13, pressure is trapped in the respective brake cylinders.

It will be understood that the by-passing equipment 103, 104 will permit releasing of the brakes at ony time under control of the engineer or vehicle operator.

While I have illustrated the invention diagrammatically as associated with fluid pressure braking equipment of the triple valve, auxiliary reservoir type, it is to be understood that the invention may be employed in braking systems of the direct pressure type as well.

The individual gimbal structures herein disclosed and by which the tandem wheel truck units are mounted on the king posts are specifically claimed in my co-pending application for United States Letters Patent filed May 20, 1939, and identified by Serial Number 274,847.

The wheel structure herein generally disclosed is specifically claimed in my co-pending application for United States Letters Patent filed May 20, 1939, and identified by Serial Number 274,848.

The tie bar or truck unit connecting structure herein generally disclosed is claimed in my co-pending application for United States Letters Patent filed May 20, 1939, and identified by Serial Number 274,846.

It is of course to be understood that the details of structure and arrangement of parts may be variously changed and modified without departing from the spirit and scope of my invention.

I claim:

1. In a wheeled vehicle, a truck frame, a brake shoe equipment engageable with and disengageable from a wheel, fluid pressure actuated means for imparting movement to said brake shoe equipment, a normally open valve for controlling the flow of pressure fluid to said pressure actuated means, and means for mounting the brake shoe swingably about a fixed axis coinciding with the axis of rotation of the wheel and directly connected with said valve and movable with said shoe equipment under braking action urge for closing said valve as the braking force exceeds a predetermined maximum.

2. In a wheeled vehicle, a truck frame, a brake shoe equipment engageable with and disengageable from a wheel, fluid pressure actuated means for imparting movement to said brake shoe equipment, a normally open valve for controlling the flow of pressure fluid to said pressure actuated means, means for mounting the brake shoe swingably about a fixed axis coinciding with the axis of rotation of the wheel and directly connected with said valve and movable with said shoe equipment under braking action urge for closing said valve as the braking force exceeds a predetermined maximum and spring means determining said predetermined maximum.

3. In a wheeled vehicle, a truck frame, a brake shoe equipment engageable with and disengageable from a wheel, fluid pressure actuated means for imparting movement to said brake shoe equipment, a normally open valve for controlling the flow of pressure fluid to said pressure actuated means, means for mounting the brake shoe swingably about a fixed axis coinciding with the axis of rotation of the wheel and directly connected with said valve and movable with said shoe equipment under braking action urge for closing said valve as the braking force exceeds a predetermined maximum, spring means determining said predetermined maximum, and means for adjusting the resistance of said spring.

4. In a braking mechanism of the character described, the combination with a wheel and its mounting frame, of a yoke movably mounted and straddling a flange of the wheel, a brake shoe supported on said yoke at each side of said wheel, yieldable means resisting movement of said yoke under braking action urge, fluid pressure actuated means for moving the brake shoes against the wheel including a normally open pressure controlling valve, and means connecting said yoke with the valve whereby when said yoke moves a predetermined distance it will close said valve and cut off pressure application.

5. In a braking mechanism of the character described, the combination with a wheel and its mounting frame, of a yoke movably mounted and straddling a flange of the wheel, a brake shoe supported on said yoke at each side of said wheel, a compression spring supported on said frame and engaged above and below by said yoke for resisting movement of said yoke under braking action urge, fluid pressure actuated means for moving the brake shoes against the wheel including a normally open pressure controlling valve, means connecting said yoke with the valve whereby when said yoke moves a predetermined distance it will close said valve and cut off pressure application, and means for adjusting the resistance of said spring.

6. In a braking mechanism of the character described, the combination with a wheel and its mounting frame, of a yoke movably mounted and straddling a flange of the wheel, a brake shoe supported on said yoke at each side of said wheel, yieldable means resisting movement of said yoke under braking action urge, a brake shoe actuator pivotally mounted at each side of the yoke and having a brake shoe carrying arm portion and an actuator arm portion, fluid pressure actuated means for imparting movement to said actuator arm portions and brake shoes and including a normally open pressure controlling valve, and means connecting said yoke with the valve whereby when said yoke moves a predetermined distance it will close said valve and cut off pressure application.

7. In a braking mechanism of the character described, the combination with a wheel and its mounting frame, of a yoke movably mounted and straddling a flange of the wheel, a brake shoe supported on said yoke at each side of said wheel, a compression spring supported on said frame and engaged above and below by said yoke for resisting movement of said yoke under braking action urge, a brake shoe actuator pivotally mounted at each side of the yoke and having a brake shoe carrying arm portion and an actuator arm portion, fluid pressure actuated means for imparting movement to said actuator arm portions and brake shoes and including a normally open pressure controlling valve, means connecting said yoke with the valve whereby when said yoke moves a predetermined distance it will close said valve and cut off pressure application, and means for adjusting the resistance of said spring.

8. In a braking mechanism of the character described, the combination with a wheel and its mounting frame, of a yoke movably mounted and straddling a flange of the wheel, a brake shoe supported on said yoke at each side of said wheel, yieldable means resisting movement of said yoke under braking action urge, a brake shoe actuator pivotally mounted at each side of the yoke and having a brake shoe carrying arm portion and an actuator arm portion, fluid pressure actuated means for imparting movement to said actuator arm portions and brake shoes and including a normally open pressure controlling valve, a brake cylinder and a pressure line leading to said cylinder through said valve, means connecting said yoke with the valve whereby when said yoke moves a predetermined distance it will close said valve and cut off pressure application, and a by-pass in said line around said valve and effective only in the direction leading away from said brake cylinder and back through said line.

9. In a braking mechanism of the character described, the combination with a wheel and its mounting frame, of a yoke swingable about the axis of the wheel and straddling a flange of the wheel, a brake shoe supported on said yoke at each side of said wheel, a compression spring supported on said frame and engaged above and below by said yoke for resisting movement of said yoke under braking action urge, fluid pressure actuated means for moving the brake shoes against the wheel including a normally open pressure controlling valve, means connecting said yoke with the valve whereby when said yoke moves a predetermined distance it will close said valve and cut off pressure application, and means for adjusting the resistance of said spring.

10. In a tandem wheel truck unit, a fluid pressure actuated braking means associated with each wheel, means including a normally open valve for supplying pressure fluid to each braking means, means movable with said braking means under braking action urge to close said valve as the braking force exceeds a predetermined maximum, and manually operable means for actuating all of said braking means simultaneously and independent of said fluid pressure actuation.

11. In a braking mechanism of the character described, the combination with a wheel and its mounting frame, of a yoke movably mounted and straddling a flange of the wheel, a brake shoe supported on said yoke at each side of said wheel, yieldable means resisting movement of said yoke under braking action urge, fluid pressure actuated means for moving the brake shoes against the wheel including a normally open pressure controlling valve, means connecting said yoke with the valve whereby when said yoke moves a predetermined distance it will close said valve and cut off pressure application, and manually operable means for actuating said braking means independent of said fluid pressure actuation.

HENRY FORT FLOWERS.